United States Patent
Tirosh et al.

(10) Patent No.: US 11,632,972 B2
(45) Date of Patent: Apr. 25, 2023

(54) S-NITROSOTHIOL COMPOUNDS AND THEIR COMBINATIONS WITH NITROSAMINE BLOCKING AGENTS FOR SAFE FOOD PRESERVATION

(71) Applicant: YISSUM RESEARCH DEVELOPMENT COMPANY OF THE HEBREW UNIVERSITY OF JERUSALEM LTD., Jerusalem (IL)

(72) Inventors: Oren Tirosh, Nes Tziona (IL); Joseph Kanner, Rehovot (IL); Adi Spaizer-Katzenelson, Tel Aviv (IL)

(73) Assignee: YISSUM RESEARCH DEVELOPMENT COMPANY OF THE HEBREW UNIVERSITY OF JERUSALEM LTD., Jerusalem (IL)

( * ) Notice: Subject to any disclaimer, the term of this patent is extended or adjusted under 35 U.S.C. 154(b) by 483 days.

(21) Appl. No.: 16/635,032

(22) PCT Filed: Jul. 31, 2018

(86) PCT No.: PCT/IL2018/050851
§ 371 (c)(1),
(2) Date: Jan. 29, 2020

(87) PCT Pub. No.: WO2019/026073
PCT Pub. Date: Feb. 7, 2019

(65) Prior Publication Data
US 2020/0245650 A1    Aug. 6, 2020

Related U.S. Application Data

(60) Provisional application No. 62/539,565, filed on Aug. 1, 2017.

(51) Int. Cl.
*A23L 3/3535*    (2006.01)
*A23L 13/40*    (2023.01)
(Continued)

(52) U.S. Cl.
CPC .......... *A23L 3/3535* (2013.01); *A23B 4/0235* (2013.01); *A23B 4/12* (2013.01);
(Continued)

(58) Field of Classification Search
CPC ........ A23L 3/3535; A23L 3/42; A23L 3/3418; A23B 4/0235; A23B 4/12; A23B 4/20
See application file for complete search history.

(56) References Cited

U.S. PATENT DOCUMENTS

| | | | |
|---|---|---|---|
| 3,184,505 A | 5/1965 | Martin | |
| 3,966,974 A | 6/1976 | Bharucha et al. | |

(Continued)

FOREIGN PATENT DOCUMENTS

| | | |
|---|---|---|
| AU | 725573 | 10/2000 |
| CN | 105360285 | 3/2016 |
| WO | 2013/169538 | 11/2013 |

OTHER PUBLICATIONS

Morakinyo, Moshood Kayode, "S-Nitrosothiols: Formation, Decomposition, Reactivity and Possible Physiological Effects" (2010). Dissertations and Theses. Paper 100. https://doi.org/10.15760/etd.100 (Year: 2010).*

(Continued)

*Primary Examiner* — Stephanie A Cox
(74) *Attorney, Agent, or Firm* — Browdy and Neimark, PLLC (57) ABSTRACT

The invention relates to a process for treating food, in particular for curing meat, comprising adding to the food a compound of Formula III, which is a derivative of S-nitrosocysteine. Use of the compound of Formula III as food preservative and compositions for curing meat are also provided by the invention.

21 Claims, 8 Drawing Sheets

(51) Int. Cl.
  *A23B 4/023* (2006.01)
  *A23B 4/12* (2006.01)
  *A23B 4/20* (2006.01)
  *A23L 3/3418* (2006.01)

(52) U.S. Cl.
  CPC .............. *A23B 4/20* (2013.01); *A23L 3/3418* (2013.01); *A23L 13/42* (2016.08); *A23V 2002/00* (2013.01)

(56) References Cited

U.S. PATENT DOCUMENTS

| | | | |
|---|---|---|---|
| 4,346,117 A | | 8/1982 | Thompson et al. |
| 4,559,234 A | | 12/1985 | Rubin et al. |
| 6,613,937 B2 | * | 9/2003 | Tsikas .................. A61P 9/08 560/147 |
| 11,540,540 B2 | * | 1/2023 | Goodman ................. A23B 4/03 |
| 2009/0004353 A1 | * | 1/2009 | Topps .................... A23L 13/70 426/643 |
| 2012/0315365 A1 | * | 12/2012 | Lee ......................... A23L 13/65 426/574 |
| 2015/0147396 A1 | * | 5/2015 | Nacharaju ............... A61K 9/51 514/706 |
| 2017/0000755 A1 | * | 1/2017 | Arhancet ................. A23K 50/10 |
| 2017/0105438 A1 | * | 4/2017 | Ajami .................... A23L 13/426 |
| 2022/0369811 A1 | * | 11/2022 | Bertschi ................ F25D 17/042 |

OTHER PUBLICATIONS

Cammack et al., "Nitrite and nitrosyl compounds in food preservation", Biochimica et Biophysica Acta (BBA)—Bioenergetics, vol. 1411, Issues 2-3, May 5, 1999, pp. 475-488. Retrieved from Internet URL: https://doi.org/10.1016/S0005-2728(99)00033-X. (Year: 1999).*

Bonnett, et al., Journal of the Chemical Society, Perkin Transactions 1: Organic and Bio-Organic Chemistry (1972-1999) 1979, (8), 1069-70.

Canmmack, et al. in Biochimica et Biophysica Acta 1411, pp. 475-488, 1999.

Dennis, et al., "Journal of the Science of Food & Agriculture", 1980, vol. 31, No. 11, pp. 1195-2000.

Incze, et al., "Anti-bacterial effect of cysteine nitrosothiol & possible precursors thereof", Applied Microbiology, vol. 27, No. 1, Jan. 1, 1974, pp. 202-205.

Kanner, J, et al., J. Sci 45 (5), pp. 1105-1108, 1980.

Pirie, et al., Biochemical Journal 27 176, 1933.

International Search Report for PCT/IL2018/050851 dated Nov. 22, 2018, 5 pages.

Written Opinion of the ISA for PCT/IL2018/050851 dated Nov. 22, 2018, 6 pages.

Search report for corresponding Chinese Patent Application No. 201880050399.0, dated Oct. 10, 2022, with English translation.

* cited by examiner

S-NITROSOTHIOL COMPOUNDS AND THEIR COMBINATIONS WITH NITROSAMINE BLOCKING AGENTS FOR SAFE FOOD PRESERVATION

This application is the U.S. national phase of International Application No. PCT/IL2018/050851 filed Jul. 31, 2018 which designated the U.S. and claims priority to U.S. Provisional Patent Application No. 62/539,565 filed Aug. 1, 2017, the entire contents of each of which are hereby incorporated by reference.

BACKGROUND OF THE INVENTION

Nitrite has been traditionally used by the meat industry as an additive to serve a multifold purpose: preservation of meet (owing to the unique ability of nitrite to prevent the growth of *Clostridium botulinum*), development of the characteristic pink to red color of the meat and contribution to flavor.

Despite its useful properties, nitrite is notorious because it reacts with secondary amines found in meat (e.g., in proteins). The reaction of nitrite and secondary amines leads to the formation of N-nitrosamines, which have been recognized as carcinogens. The term "nitrosamine" refers to chemical compounds of the general Formula I, having N-nitroso (—N—N═O) group ($R^1$ and $R^2$ stand for organic moieties):

(Formula I)

Nitrosamines are formed when nitrites and secondary amines are allowed to contact under certain conditions, including strongly acidic environment and high temperatures, e.g., in cooking and frying processes carried out by the meat industry.

Therefore, auxiliary additives intended to suppress formation of N-nitrosamines, e.g., chiefly ascorbic acid, isoascrobic acid or salts thereof, are conventionally incorporated into nitrite-cured meat products to act as nitrosamine blocking agents. But these auxiliary additives are only able to reduce the level of N-nitrosamine formation in nitrite-cured meat products to a limited extent.

A better approach to solving the N-nitrosamine formation problem is of course to locate nitrite replacements, which would exhibit preservative action comparable to that of nitrite yet lesser reactivity towards secondary amine and N-nitrosamine formation. But so far, no substitute of nitrite was able to gain commercial acceptance, apparently due to the unmatchable effect possessed by nitrite, in particular as a potent preservative against the aforementioned toxin-forming bacteria. For example, in U.S. Pat. No. 3,966,974 it has been proposed to use organic nitrites in place of sodium nitrite. In U.S. Pat. No. 4,346,117 metal hypophosphite salts, e.g., $Na(H_2PO_2)$ was tested as a substitute for sodium nitrite. U.S. Pat. No. 4,559,234 reports that nitrite-free meat product indistinguishable from nitrite-cured meat could be achieved with the aid a curing composition comprising dinitrosylferrohemochrome, namely, iron-sulfur-nitrosyl (Fe—S—NO) complex, an antioxidant and an antimicrobial agent.

A review dealing with nitrite and nitrosyl compounds in food preservation [Canmmack et al. in Biochimica et Biophysica Acta 1411 p. 475-488 (1999)], mentions different types of nitrite-related bacteriostatic compounds, including S-nitrosothiols. S-Nitrosothiols are compounds represented, in their most general form, by Formula II:

(Formula II)

where R is an organic moiety. Incze et al. [Applied Microbiology p. 202-205 (1974)] reported that a compound of Formula II where R is cysteine exhibits antimicrobial activity higher than nitrite on various bacteria. The authors of the paper then went on to suggest that the compound under consideration, namely, S-nitrosocysteine which has the chemical structure depicted below:

could potentially replace nitrite in meat preservation, based on the assumption that N-nitrosamines formation is likely to be lesser when S-nitrosocysteine is used as an additive, in comparison with direct use of nitrite.

But experimental results reported below indicate that sodium nitrite and S-nitrosocysteine are roughly comparable in terms of N-nitrosamines formation and under some conditions the use of S-nitrosocysteine may even lead to greater production of N-nitrosamines. In the experimental work conducted in support of this invention, the conversion of a characteristic secondary amine (N-methyl aniline) into the corresponding nitrosamine in the presence of sodium nitrite and S-nitrosocysteine was investigated under acidic pH conditions to simulate stomach and nearly neutral pH conditions to stimulate meat. The effect of additive concentration and reaction temperature were also studied. The results shown below, which indicate that S-nitrosocysteine cannot really replace nitrite as food preservative, seem to be in line with data reported by Dennis et al. [Journal of the Science of Food and Agriculture (1980), 31(11), 1195-2000], where nitrite and S-nitrosocysteine were shown to produce similar effect in terms of nitrosamine formation.

SUMMARY OF THE INVENTION

Modified forms of S-nitroso-cysteine (e.g., the N-acyl derivatives) have emerged from the studies reported below as effective replacements of nitrite in food. These derivatives have been shown to generate surprisingly minute amounts of nitrosamine from the reaction with secondary amine, i.e., significantly less than the amounts measured for the parallel reactions of secondary amines with the currently used preservative sodium nitrite or S-nitroso-cysteine.

Thus, the present invention is directed to a process for treating food (including beverage), for example, a process of curing meat, comprising the step of adding to the food a compound of Formula III:

(Formula III)

Formula III-A-1 wherein $X_1$ and $X_2$ are independently selected from the group consisting of hydrogen, acyl group (e.g. lower acyl such as $R_1C(O)$—, wherein $R_1$ is C1-C5 alkyl, for example, acetyl $CH_3C(O)$—) and alkyl group (e.g. lower alkyl such as C1-C5 alkyl, for example, —$CH_3$), wherein at least one of $X_1$ and $X_2$ is other than hydrogen;

$X_3$ is selected from the group consisting of hydrogen, non-toxic metal cations (such as alkali metals) and C1-C5 alkyl groups (e.g., —$CH_3$, —$C_2H_5$); and $X_4$ and $X_5$ are independently selected from the group consisting of hydrogen and C1-C5 alkyl (e.g., —$CH_3$, —$C_2H_5$).

It should be noted that the derivatives of S-nitrosocysteine of Formula III that are contemplated by the invention include derivatives of the naturally occurring L enantiomer, the D enantiomer and mixtures thereof. Hence formulas presented herein should be understood accordingly. Preferably, however, the compounds of Formula III are derivatives of L-cysteine.

Especially preferred are compounds of Formula III wherein $X_4$ and $X_5$ are both hydrogen in the free acid form (that is, $X_3$ is hydrogen), represented by Formula III-A:

(III-A)

Non-toxic, preferably water-soluble salts and ester derivatives of the acids of Formula III-A can also be used, i.e., compounds of Formula III-A': (ON)—S—$CH_2$—CH($NX_1X_2$)—C(O)—$OX_3$ where $X_3$ is a metal or low alkyl (—$CH_3$, —$C_2H_5$) but in general the free acid of Formula III-A exhibits good water solubility at nearly neutral pH and can be added to the meat by injection of aqueous solutions as described below.

Preferably, in the compounds of Formula III or III-A, $X_1$ is hydrogen and $X_2$ is an acyl group, e.g., $CH_3C(O)$—, $CH_3CH_2C(O)$—, $CH_3CH_2CH_2C(O)$—. Especially preferred is the acetyl derivative, that is, S-nitroso-N-acetylcysteine (S-nitroso-N-acetyl-L-cysteine, sometimes abbreviated herein NAC-SNO):

The tests reported below also show that a mixture of a compound of Formula III (e.g., III-A, especially S-nitroso-N-acetylcysteine) with additives that are conventionally used to inhibit formation of nitrosamine in meat, such as ascorbic acid, generate a very good effect under storage conditions in a refrigerator. At 4° C., these mixtures have been shown to reduce nitrosamine formation to a greater extent than comparative mixtures (namely, mixtures consisting of sodium nitrite/ascorbic acid and S-nitrosocysteine/ascorbic acid).

Another aspect of the invention is a process for treating food (including beverage), for example, a process of curing meat, comprising the step of adding to the food or beverage a mixture of a compound of Formula III (e.g., III-A) and an inhibitor of nitrosamine formation, such as ascorbic acid, isoascorbic acid or a physiologically acceptable salt or ester thereof, or other scavengers of NO oxidizing species. A mixture of a compound of Formula III and ascorbic acid, isoascorbic acid or a physiologically acceptable salt or ester thereof, and its use as food additive for inhibiting nitrosamine formation form additional aspects of the invention. These mixtures would generally be proportioned from about 1:0.1 to 1:50, e.g., 1:1 to 1:10 (weight ratio Formula III-A:vitamin C).

The compound of Formula III (e.g., III-A) can be incorporated into the meat in a solid or liquid form along with other additives. Hence the invention also provides a composition for curing meat comprising a compound of Formula III (e.g., III-A) and at least one meat additive (such as sodium chloride, potassium chloride, sugar, antioxidants, inhibitors of nitrosamine formation comprising one or more of ascorbic acid and physiologically acceptable salts or esters thereof, flavor additives and a mixture thereof). Meat treating composition, for example, a liquid composition comprising water and a compound of Formula III (e.g., III-A) dissolved or dispersed therein, optionally together with other additives as described in more detail below are also part of the invention.

DETAILED DESCRIPTION OF THE INVENTION

The compounds of Formula III are either commercially available or can be synthesized by methods known in the art.

Compounds of Formula III (e.g., III-A) are generally prepared from the reaction of the corresponding thiol with alkali nitrite in a strongly acidic environment under inert atmosphere, as illustrated by Kanner J. and Juven B. J., 1980, J. sci. 45(5), 1105-1108. The thiol starting material required for this reaction, e.g., N-monoacylated cysteine, is either commercially available or can be prepared by known methods described in U.S. Pat. No. 3,184,505 and references mentioned therein, illustrating the synthesis of N-acetylcysteine, N-propionyl-cysteine and N-butyryl-cysteine.

S-nitroso-N,N'-diacetyl cysteine ($X_1$ and $X_2$ in Formula III-A are both $CH_3C(O)—$) can also be prepared by the aforementioned method, where the thiol starting material is obtained by the method described by Pirie et al. Bichemical Journal 27 176 (1933)].

The ester derivatives of Formula III, namely, compounds of Formula III-A' of the Formula (ON) —S—$CH_2$—CH ($NX_1X_2$) —C(O) —$OX_3$ where $X_3$ is low alkyl (—$CH_3$, —$C_2H_5$) are described in U.S. Pat. No. 6,613,937 and Bonnett et al. Journal of the Chemical Society, Perkin Transactions 1: Organic and Bio-Organic Chemistry (1972-1999) (1979), (8), 1069-7.

A compound of Formula III wherein $X_4$ and $X_5$ are both methyl, for example S-Nitroso-N-acetyl-penicillamine ($X_1$ is hydrogen, $X_2$ is acetyl and $X_3$ is hydrogen, commonly abbreviated "SNAP") is commercially available in the market in a powder form.

It should be pointed out that the compounds of Formula III can be put to use in the form of aqueous solutions or solids (e.g., crystalline or freeze-dried powders).

Compound of Formula III, or more preferably, a mixture of a compound of Formula III with one or more inhibitors of nitrosamine formation, especially vitamin C, may be used in poultry products (for example, smoked poultry such as smoked poultry breasts and smoked poultry rolls); corned beef; and other meat products such as ham or bacon, and meat-based sausages. This is of course a non-limiting list of major meat products. Other products to be mentioned include fish, cheese, beer and other products currently preserved with nitrite pickling solution. The compound of Formula III (e.g., III-A) is added to the food product in a sufficient concentration to exert its useful effect, for example, at least 20 ppm of the compound of Formula III (e.g., III-A) is added to the meat, for example, from 30 to 1000 ppm, more specifically from 50 to 500 ppm, e.g., from 100 to 400 ppm, for example, from 100 to 200 ppm. The process of the invention enables reduced nitrite addition to meat: nitrite may be added in amounts lower than currently acceptable in the industry, e.g., below 150 ppm, i.e., 0-150 ppm, preferably below 120 ppm, e.g., below 75 ppm in the meat. The process of the invention can be devoid of nitrite addition.

Additives known in the art as "inhibitors of nitrosamine formation", "blocking agent of nitrosamine formation", "nitrosamine scavengers" and the like are chemical compounds capable of preventing or blocking or reducing the formation or activity of a nitrosamine, especially in foods, e.g. preserved foods, such as, without being limited to, meat, cheese, fish, malt beer products. Examples of such blocking agents of nitrosamine formation which are suitable for use in the invention, include vitamin C (ascorbic acid and derivatives thereof (e.g., ascorbyl-palmitate), which have been shown to work surprisingly well together with the compound of Formula III), vitamin E and derivatives thereof, the sodium salt of erythorbic acid, phenols, polyphenols, such as gallic acid, tannic acid, and thiol containing compounds. Other examples of nitrosonium scavengers include benzoates, tocopherols, tocotrienols, thiocyanates, BHT, BHA, TBHQ and derivatives, sulphites, betalains and derivatives, carotenoids, retinols, glucosinolates, maltol and in general reducing agents alone or in different amounts together for generating synergistic effects.

As pointed out above, the compound of Formula III (e.g., III-A) may be added to the meat in a solid form, namely, a mixture comprising a compound of Formula III, an inhibitor of nitrosamine formation and conventional additives such as sodium chloride and sugars may be added to the meat without the addition of water, for example, by rubbing the meat with the solid composition and allowing the ingredient to diffuse into the meat over a suitable period of time. Hence, a solid meat treating composition comprising a compound of Formula III (e.g., III-A), sodium chloride and/or one or more sugars is also provided by the invention. For example, the invention provides a curing salt mixture comprising from 0.5 to 20% by weight a compound of Formula III+80 to 99.5% sodium chloride, e.g., from 2 to 20% by weight a compound of Formula III+80 to 98% sodium chloride. The curing salt mixture may further contain nitrite in an amount lower than currently used in commercial blends, e.g., from 0 to 5% by weight nitrite.

Another method of incorporating the compound of Formula III into the meat is with the aid of a liquid meat treating composition comprising water, the compound of Formula III, sodium chloride, optionally sugars (glucose, fructose, sucrose, that is, a monosaccharide or a disaccharide) and optionally one or more of the aforementioned inhibitors of nitrosamine formation, e.g., ascorbic acid. For example, suitable aqueous brines contain, on a weight basis, in addition to water and a compound of Formula III in an amount sufficient to provide about 20 to 1000 ppm of the compound of Formula III (e.g., III-A) in the meat, also the following ingredients (% by weight (g/100 g):

from 0.05% up to solubility limit of sodium chloride, e.g., from 5 to 25% NaCl (more specifically, the concentration of the salt in the aqueous brine is adjusted to supply not more than 10% NaCl in the meat, generally about 2% salt w/w of the aqueous content of the meat);

optionally from 0.05 to 15% by weight sugars, e.g., from 1 to 10%, and from 0.05 to 5% by weight and ascorbic acid, isoascrobic acid esters or salts thereof (the concentration of the ascorbic acid in the aqueous brine is adjusted to supply about 400 to 500 mg ascorbic acid per kilogram meat).

The meat treating liquid composition is applied using conventional techniques. For example, the composition could be injected or pumped into the meat with the aid of suitable needles. Alternatively or in addition, the meat is immersed in the liquid composition to soak, i.e., for a sufficient time to enable diffusion of the liquid throughout the meat. Detailed procedures for producing meat products, such as whole smoked turkey and smoked chopped chicken using pickle solutions can be found in U.S. Pat. No. 4,346,117 (of course substituting sodium hypophosphite in the pickle solutions of U.S. Pat. No. 4,346,117 with the additive of Formula III according to the invention).

It should be noted that the process of the invention, which includes the incorporation of a compound of Formula III into the meat, preferably in conjunction with one or more nitrosonium scavengers, may also include a step of providing low-oxygen environment, e.g. by creating vacuum or purging with nitrogen (or other inert gas) to replace oxygen with the inert gas in all stages of food products preparation, packaging, storage and marketing. That is, the addition of the compound of Formula III takes place prior to, simultaneously with or subsequent to vacuum (or other inert gas) creation or the formation of low oxygen-environment.

A food product which contains at least 10 ppm, e.g., 20 ppm of a compound of Formula III (as such, or in the form obtained upon NO release, i.e., the corresponding free thiol, or in both forms), e.g., from 30 to 1000 ppm, more specifically from 50 to 500 ppm, e.g., at least 100 ppm (from 100 to 400 ppm, for example, from 100 to 200 ppm); and at least 20 ppm, at least 30 ppm, and preferably also at least 50 ppm ascorbic acid or other blocking agents, constitutes another aspect of the invention. The food (e.g., meat) product may be nitrite-free, but it should be noted that the compound of Formula III does not necessarily be used to eliminate nitrite completely but rather to reduce the amount of added nitrite. Hence, in some embodiments, a nitrite-cured meat product comprising nitrite at a concentration up to 150 ppm (0-150 ppm), e.g., from 5 to 120 ppm, and preferably below 75 ppm, in conjunction with the additive of the invention, is also provided.

The compound of Formula III (e.g., III-A) may be used in conjunction with nitrite salts or S-nitrosocysteine to achieve beneficial effects. One example in which the compound of Formula III and nitrite can be applied together to achieve a better effect is by injection of a nitrite salt to the meat such that it is present during the conventional heating, cooking and/or smoking steps. The nitrite is added at a fairly low level, in order to benefit from the unique action of nitrite (color and bacteriostatic effects), but without allowing remnant nitrite in the cooked/smoked product. The compound of Formula III (e.g., III-A) is added to compensate for the reduced loading level of the nitrite; the addition of the compound of Formula III may take place before, during or subsequent to the heating, by means of spraying, brushing or using a second injection step before packaging.

The compounds of Formula III (e.g., III-A) are used in processes for treating food, to serve one or more purposes such as reducing microorganism (e.g., reducing number of microorganism, inhibit (or slowing down) the increase in the number of microorganism over time, preventing or eliminating microorganism growth, e.g., of microorganism mentioned herein), improve color and contribute to flavor. The experimental results reported below show that the compound of Formula III (e.g., III-A, in particular S-nitroso-N-acetylcysteine) offers a set of benefits. In a meat model system, where N-methylaniline was used as a benchmark to asses formation of N-nitrosamine (i.e., N-nitroso-methylaniline) in the presence of either sodium nitrite, S-nitroso-cysteine and S-nitroso-N-acetylcysteine, together with sodium chloride and ascorbic acid customarily added to meat products, it was found that conversion of N-methyl-aniline to the corresponding N-nitrosamine occurs to a lesser extent in the presence of S-nitroso-N-acetylcysteine as compared to sodium nitrite and S-nitroso-cysteine. In acidic environment simulating stomach conditions, the advantage of S-nitroso-N-acetylcysteine over sodium nitrite is even more significant. During storage of the meat in vacuum packing bags, conversion of N-methylaniline to the corresponding N-nitrosamine occurs more appreciably in the nitrite-added meat, or in the (S-nitroso-cysteine)-added meat, than in the (S-nitroso-N-acetylcysteine)-added meat; in the latter case the level of N-nitrosamine was found to be essentially constant over the tested storage period. Applying high vacuum conditions during storage inhibits conversion of N-methylaniline to the corresponding N-nitrosamine for both the nitrite-added meat and S-nitroso-cysteine-added meat compared to aerobic conditions; but levels of N-nitrosamine were still higher than those measured in the (S-nitroso-N-acetylcysteine)-added meat. Hence the results indicate the sensitivity of nitrite and S-nitroso-cysteine to the level of oxygen in the surrounding of the product: the higher the oxygen level, the greater the production of N-nitrosamine by these additives. In contrast, S-nitroso-N-acetylcysteine is fairly insensitive to changes in oxygen levels and would not respond to increase in oxygen level (i.e., due to penetration of oxygen to the package) by enhanced production of N-nitrosamine. With S-nitroso-N-acetylcysteine, production of N-nitrosamine remains fairly low and constant under both anaerobic and aerobic conditions. S-nitroso-N-acetylcysteine further displays good stability under long storage periods at 4° C. In summary, S-nitroso-N-acetylcysteine demonstrates lower reactivity as nitrosylation agents towards secondary amines as compared to nitrite and S-nitroso-cysteine under conditions simulating meat production and packaging and stomach digestion.

Additionally, the experimental results reported below show that S-nitroso-N-acetylcysteine displays adequate antimicrobial activity, at least comparable to that of nitrite. Other important functions served by nitrite in the meat industry—meat color preservation and meat flavor enhancement—are served at least equally well by S-nitroso-N-acetylcysteine. In fact, as shown below, (S-nitroso-N-acetylcysteine)-added meat retains excellent color properties for longer periods of time than nitrite-added meat.

EXAMPLES

Materials

Trisodium citrate, hydrochloric acid (HCl) 37%, N-methylaniline, L-ascorbic acid (AA), sodium nitrite, L-cysteine and N-acetyl-L-cysteine were purchased from Sigma-Aldrich (USA). Acetonitrile, water and sodium chloride were purchased from J.T. Baker (USA). Citric acid was obtained from Bio-Lab Ltd. (Israel). Citrate buffer was prepared by mixing appropriate amounts of 0.1 M citric acid and 0.1 M trisodium citrate, pH was adjusted using HCl. All solvents were HPLC grade. Fresh ground beef was purchased at a local supermarket.

Methods

The HPLC separation was performed on a Merck/Hitachi HPLC system consisting of a LaChrom L 7100 pump and a LaChrom DAD L 7450 detector. The system was operated with a data processor working with a LaChrom interface D 7000 and the EZChrom Elite 3.3.1 software. The mixture was separated on a Kinetex EVO C18 column (250×4.6 mm, 5 μm) using a gradient elution system, solvent A was 5% acetonitrile in water (v/v) and B was acetonitrile. Gradient conditions were initial=0% B, 25 min=70% B and 30 min=100% B. The flow rate was constant at 1.0 mL min$^{-1}$. The injection loop volume was 20 μL, absorbance was monitored at 272 nm.

Preparation 1

Preparation of S-nitrosothiols

S-nitrosothiols were synthesized by reacting equimolar amounts of sodium nitrite and the corresponding thiol, that is, either L-cysteine or N-acetyl-L-cysteine, in HCl (1 M). The reaction took place under nitrogen at room temperature for 5 minutes by which time a characteristic red color developed.

The so-formed S-nitrosothiols: S-nitroso-cysteine and S-nitroso-acetyl-cysteine, were quantified by measuring UV absorbance at 334 nm. Extinction coefficients were estimated from the UV spectra of non-purified S-nitrosothiols on the basis of the amount of thiol used in the reaction and assuming that the reaction went to completion. S-nitroso-cysteine and S-nitroso-acetyl-cysteine were not isolated from the reaction mixtures and were used in the form of the solutions in the experiments reported below.

Example 1

Formation of N-nitroso-N-methylaniline from the Reaction of N-methylaniline with Sodium Nitrite (Comparative), S-nitroso-cysteine (Comparative) and S-nitroso-N-acetylcysteine (of the Invention) at 37° C.

Reaction mixtures were prepared by mixing in citrate buffer, at pH=3.0 simulating stomach conditions and at pH=6.2 simulating meat conditions, N-methylaniline (0.25 mM) and NaCl (0.25 mM) together with an equimolar amount of the tested nitrosilating agent, used either alone or in combination with ascorbic acid, as set out below:

| 1. | Sodium nitrite (0.25 mM); |
| 2. | Sodium nitrite (0.25 mM) + ascorbic acid (1 mM); |
| 3. | S-nitroso-cysteine (0.25 mM); |
| 4. | S-nitroso-cysteine (0.25 mM) + ascorbic acid (1 mM); |
| 5. | S-nitroso-cysteine (0.25 mM) + ascorbic acid (2 mM); |
| 6. | S-nitroso-N-acetylcysteine (0.25 mM) |
| 7. | S-nitroso-N-acetylcysteine (0.25 mM) + ascorbic acid (1 mM) |
| 8. | S-nitroso-N-acetylcysteine (0.25 mM) + ascorbic acid (2 mM) |

The reaction vessel was placed in a water bath at 37° C. for 30 minutes. The reaction mixture was subsequently transferred to HPLC for analysis of the reaction product, N-nitroso-methylaniline. Results of the HPLC analysis, for the reaction at pH 3.0 and for the reaction at pH 6.2, are shown in the form of bar diagrams in FIG. 1 (with arrows indicating results below detection limit).

Figure 1:
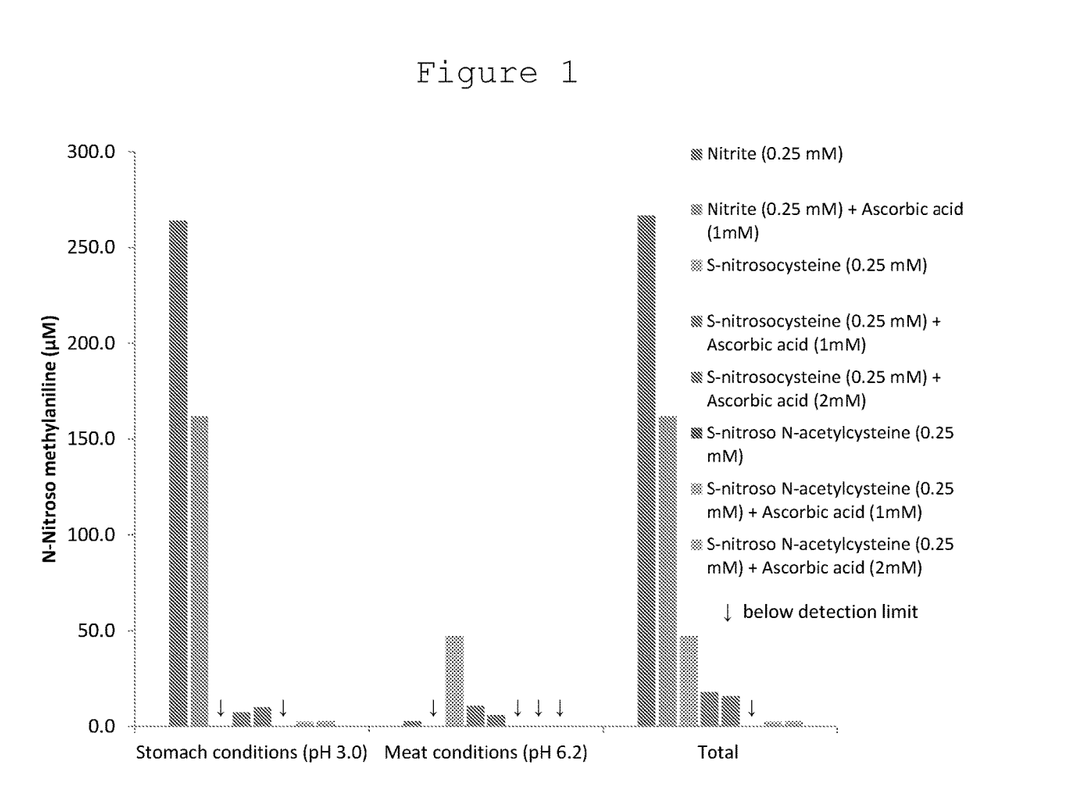
FIG. 1 is a bar diagram illustrating N-nitroso-methylaniline production at 37° C. (30 min reaction) by a reaction of N-methylaniline with different agents described in Example 1 hereinbelow. Arrows indicate amount below detection limit.

The HPLC analysis indicates that S-nitroso-N-acetylcysteine, either alone or in combination with ascorbic acid, is able to suppress the formation of nitrosamine (that is, N-nitroso-methylaniline) much more effectively than sodium nitrite or S-nitrosocysteine.

Example 2

Formation of N-nitroso-N-methylaniline from the Reaction of N-methylaniline with Sodium Nitrite (Comparative), S-nitroso-cysteine (Comparative) and S-nitroso-N-acetylcysteine (of the Invention) at 37° C.

The experiment of Example 1 was repeated with a tenfold increase of concentration of the reactants. That is, reaction mixtures were prepared by mixing in citrate buffer, at pH=3.0 and at pH=6.2, N-methylaniline (2.5 mM) and NaCl (2.5 mM) together with an equimolar amount of the tested nitrosilating agent, used either alone or in combination with ascorbic acid, as set out below:

| 1. | Sodium nitrite (2.5 mM); |
| 2. | Sodium nitrite (2.5 mM) + ascorbic acid (2.5 mM); |
| 3. | S-nitroso-cysteine (2.5 mM); |
| 4. | S-nitroso-cysteine (2.5 mM) + ascorbic acid (2.5 mM); |
| 5. | S-nitroso-N-acetylcysteine (2.5 mM) |
| 6. | S-nitroso-N-acetylcysteine (2.5 mM) + ascorbic acid (2.5 mM). |

Figure 2:
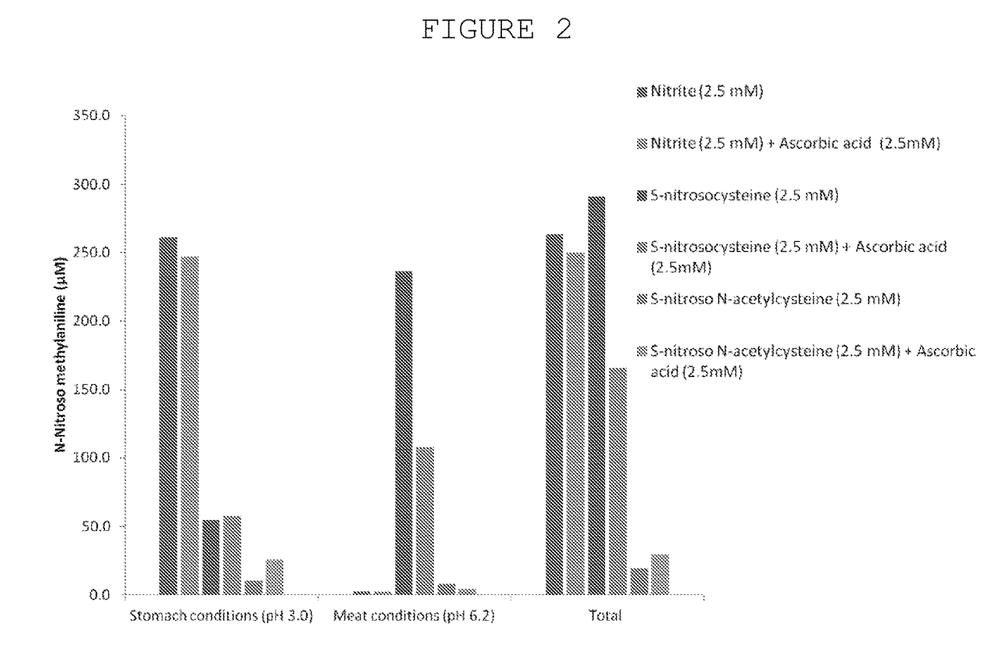
FIG. 2 is a bar diagram illustrating N-nitroso-methylaniline production at 37° C. (30 min reaction) by a reaction of N-methyl aniline with different agents described in Example 2 hereinbelow.

Results of the HPLC analysis, for the reaction at pH 3.0 and for the reaction at pH 6.2, are presented in the form of bar diagrams in FIG. 2. S-nitroso-N-acetylcysteine emerges victorious also from this study, that is, from the experiments conducted in the high concentration regime.

Figure 3:
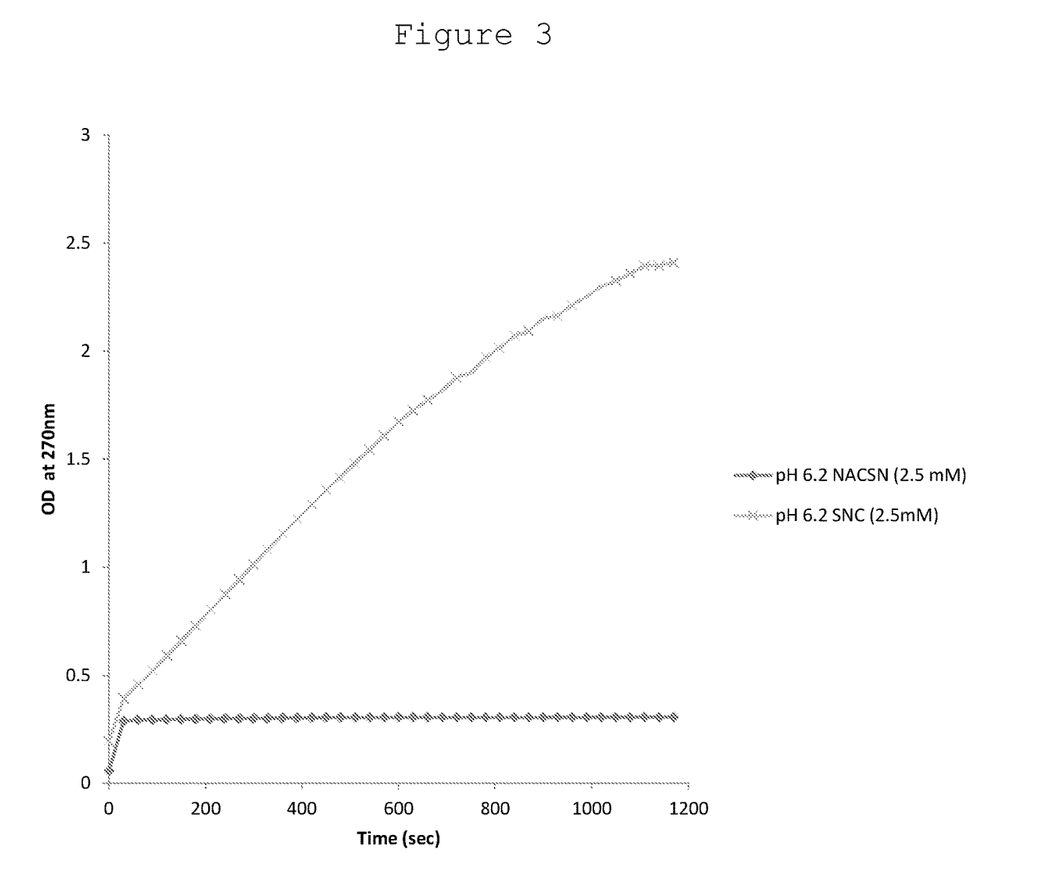
FIG. 3 shows the kinetics of N-nitroso-methylaniline formation for a reaction at pH 6.2 of N-methylaniline with S-nitroso-cysteine (2.5 mM) (upper curve) and a reaction of N-methylaniline with S-nitroso-N-acetyl-cysteine (2.5 mM) (lower curve).

FIG. 3 shows the kinetics of N-nitroso-methylaniline formation from the reaction of S-nitroso-cysteine (2.5 mM) and N-methyl aniline (2.5 mM) at pH 6.2 (the upper curve) and from the reaction of S-nitroso-N-acetylcysteine (2.5 mM) and N-methylaniline (2.5 mM) at pH 6.2 (the lower curve), as monitored by measuring UV absorbance at 270 nm over.

It is seen from the absorbance versus time plots that S-nitroso-cysteine reacts rapidly with N-methylaniline to produce progressively increasing amounts of nitrosamine. In contrast, nitrosamine formation is significantly lesser for the reaction of S-nitroso-N-acetylcysteine and N-methyl aniline and remains unchanged after a brief period time.

Example 3

Formation of N-nitroso-N-methylaniline from the Reaction of N-methylaniline with Sodium Nitrite (Comparative), S-nitroso-cysteine (Comparative) and S-nitroso-N-acetylcysteine (of the Invention) at 4° C.

The experiment of Example 2 was repeated, but this time the reaction took place at 4° C. for 24 h and pH 6.2, to simulate the conditions that are used for long-term storage of meat. That is, reaction mixtures were prepared by mixing in citrate buffer, at pH=6.2, N-methylaniline (2.5 mM) and NaCl (2.5 mM) together with an equimolar amount of the tested nitrosilating agent, used either alone or in combination with ascorbic acid, as set out below:

1. Sodium nitrite (2.5 mM);
2. Sodium nitrite (2.5 mM) + ascorbic acid (2.5 mM);
3. S-nitrosocysteine (2.5 mM);
4. S-nitrosocysteine (2.5 mM) + ascorbic acid (2.5 mM);
5. S-nitroso-N-acetylcysteine (2.5 mM)
6. S-nitroso-N-acetylcysteine (2.5 mM) + ascorbic acid (2.5 mM).

Figure 4:
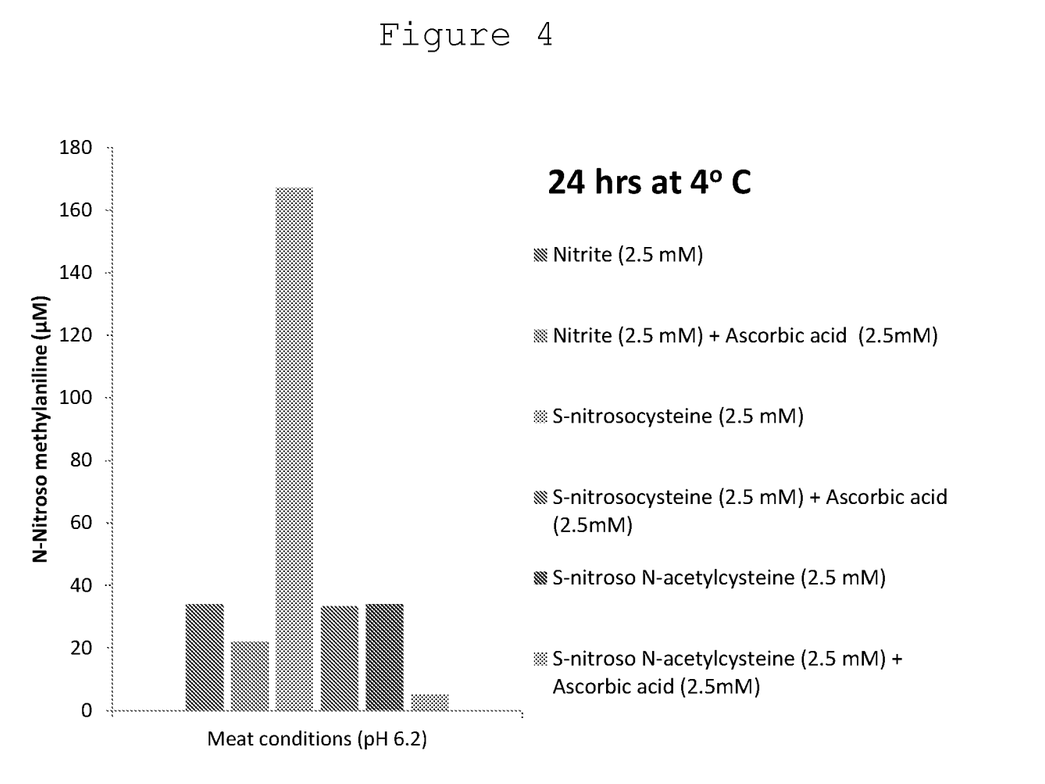
FIG. 4 is a bar diagram illustrating N-nitroso-methylaniline production at 4° C. (24 h reaction) by a reaction of N-methylaniline with different agents described in Example 3 hereinbelow.

The reaction vessel was kept at 4° C. for twenty four hours. Results of the HPLC analysis of N-nitroso-methylaniline levels are presented in the form of a bar diagram in FIG. 4. It is apparent that under storage conditions, the combination of S-nitroso-N-acetylcysteine and vitamin C performs surprisingly well, seeing that it is able to reduce the formation of N-nitroso-methylaniline very effectively.

(In bar diagrams appended, the position of the bars, from left to right, corresponds to the order of experiments reported).

Example 4

Formation of N-nitroso-N-methylaniline from the Reaction of N-methylaniline with Sodium Nitrite (Comparative), S-nitroso-cysteine (Comparative) and S-nitroso-N-acetylcysteine (of the Invention) in a Meat Model System Meat contains substances that may affect N-nitrosamines formation (e.g., ascorbic acid, free L-Cys and myoglobin). The purpose of the study reported herein was to measure N-nitrosamines formation from the secondary amine N-methylaniline added to ground beef together with the tested nitrosilating agents.

A set of experiments labeled A, B, C, D, E and F was conducted as described specifically below. In general, N-Methylaniline (0.25 mM) and NaCl (0.25 mM) were mixed into 1 gr of ground beef. Then the tested additive: sodium nitrite, S-nitroso-cysteine or S-nitroso-N-acetylcysteine (2.5 mM) was added. The concentrations were calculated as the final concentrations in the meat per Kg, using Kg=L. In one experiment (F) the experimental conditions were extended to mimic realistic meat processing (increased amount of sodium chloride and adding ascorbic acid).

The meat was processed according to an acceptable industrial meat preparation practice (GMP—Good Manufacture Practice), i.e., the meat was heated to 72° C. (in a water bath for two minutes to reach that temperature in the center of the product), then transferred to 4° C. for cooling (30 minutes) or storage (24 to 216 hours). Some of the samples were packed in vacuum bags using MULTIVAC C100, in order to assess oxygen effect on N-nitrosamine formation in meat (see Experiments D and E), whereas the rest of the samples were placed into 4 mL closed glass vials.

The meat was eventually homogenized in citrate buffer. 3 ml of citrate buffer (pH 6.2) were added to the meat and the mixture was homogenized using Kinematica Polytron PT 3000. In one experiment (C), intended to assess formation of N-nitrosamines upon digestion in an acidic stomach environment, citrate buffer at pH 3 was used to homogenize the meat. The homogenate at pH 3.0 was then incubated in a water bath at 37° C. for 30 min to simulate stomach digestion conditions.

Acetonitrile (2 ml) was added to the homogenate and vortexed for N-nitrosamine extraction. The mixture was then centrifuged for 10 min at 4696× g using Thermo Scientific Heraeus Megafuge 16R. The supernatant was filtered using a 13 mm, 0.45 µm, PTFE syringe filter for HPLC analysis.

More specifically, six different types of experiments were conducted according to the procedure outlined above with certain variations, and the results are shown in FIGS. 5A-5F, respectively:

A) The meat was heated at 72° C., cooled down to 4° C. (30 minutes) and then immediately homogenized in citrate buffer pH=6.2.
B) The meat was heated at 72° C., cooled down to 4° C., stored at 4° C. for twenty four hours and then homogenized in citrate buffer pH=6.2.
C) The meat was heated at 72° C., cooled down to 4° C., stored at 4° C. for twenty four hours, homogenized in citrate buffer pH=3.0 and incubated at 37° C. for thirty minutes.
D) After packaging in vacuum bag (vacuum to 100 mbar), the meat was heated to 72° C., stored at 4° C. for different time periods, and then homogenized in citrate buffer pH=6.2.
E) After packaging in vacuum bag (vacuum to 8 mbar), the meat was heated to 72° C., cooled to 4° C. and then immediately homogenized in citrate buffer pH=6.2 or after storage for different time periods.
F) The meat was also treated with 2% (w/w) NaCl and 3.27 mM ascorbic acid (AA, 576 ppm). The meat product was heated in a water bath at 75° C. for 5 min (temperature measured at the center of the product was 72° C. for 3 min) and stored at 4° C. for 216 hr. After storing the meat was homogenized without or with incubation in citrate buffer pH 3.0 for 30 min at 37° C. (stomach medium).

The results of these experiments are presented in the graphs of FIGS. 5A-5F, respectively; in the graphs Cys-SNO stands for S-nitroso-cysteine and NAC-SNO stands for S-nitroso-N-acetylcysteine.

Figure 5A:
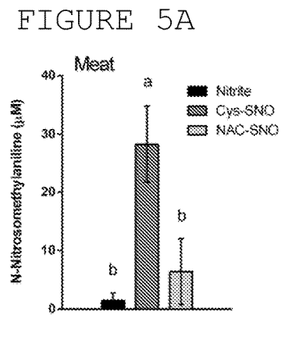
FIGS. 5A-5F show the results of a study where N-nitroso-methylaniline was formed by a reaction of N-methylaniline with different agents in a meet model system under various conditions.
Figure 5B:
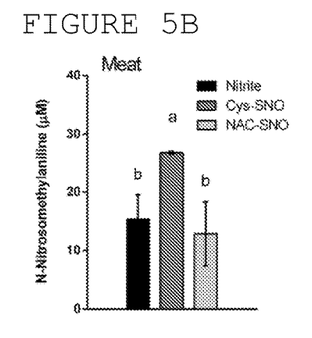
Figure 5C:
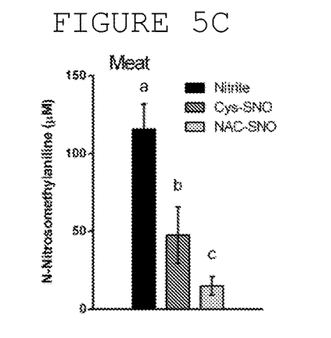
Figure 5D:
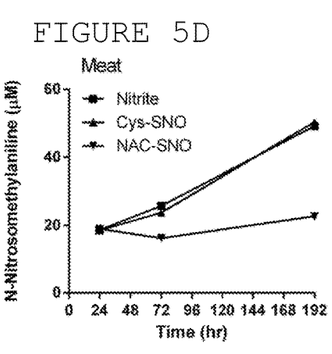
Figure 5E:
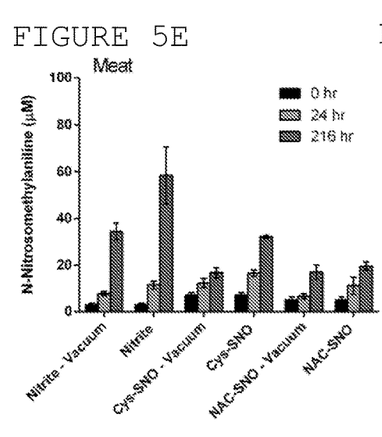
Figure 5F:
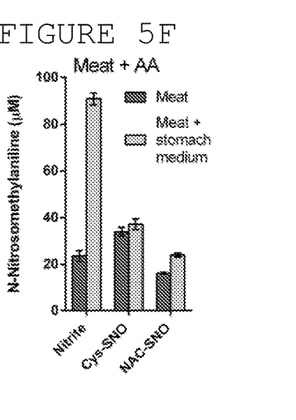

Experiments A-C: The bar diagrams indicate that immediately after heating and cooling (FIG. 5A), N-nitrosamines were formed mostly by S-nitroso-cysteine, ~28 µM, whereas both sodium nitrite and S-nitroso-N-acetylcysteine were able to keep N-nitrosamines formation levels below 10 µM. After a 24 h storage period at 4° C. (FIG. 5B) formation by nitrite and S-nitroso-N-acetylcysteine increased to 15 µM and 13 µM, respectively. N-nitrosamines formation by S-nitroso-cysteine was significantly higher than nitrite and S-nitroso-N-acetylcysteine. After consumption meat is digested in the acidic stomach pH. The results of the experiment mimicking these conditions are shown in FIG. 5C. N-nitrosamines formation by nitrite had increased considerably, by eightfold to 115 µM. Formation by S-nitroso-cysteine increased to 47 µM. However, formation by S-nitroso-N-acetylcysteine continued to remain rather low at 15 µM NA. The results indicate the ability of S-nitroso-N-acetylcysteine to suppress formation of N-nitrosamines in an acidic environment better than nitrite.

Experiments D-E: The effect of oxygen was assessed by packing the treated meat in vacuum bags prior to heating. The vacuumed meat was then heated to 72° C. and stored at 4° C., and N-nitrosamine formation was measured. At a vacuum of 100 mbar (FIG. 5D), after 24 hr storage all three treatments formed ~19 µM. However, during storage, N-nitrosamines level increased to ~50 µM after 192 h storage period in meat samples that were treated with sodium nitrite and S-nitroso-cysteine, whereas N-nitrosamines formation did not change in the S-nitroso-N-acetylcysteine-added sample, and remained ~20 µM. At stronger vacuum conditions of 8 mbar (FIG. 5E) N-nitrosamine formation by nitrite was twofold higher than the other agents after 216 hr. N-nitrosamine formation by nitrite and S-nitroso-cysteine was reduced by ~40% in anaerobic conditions compared to aerobic conditions whereas, N-nitrosamine formation by S-nitroso-N-acetylcysteine remained low and the same.

Experiment F: The results of the experiment mimicking meat processing conditions that include ascorbic acid and sodium chloride addition to the meat (FIG. 5F) show that the transfer of the meat to simulated stomach medium at pH 3.0 for only 30 min generated high concentration of N-nitrosamine by nitrite in the presence of ascorbic acid: N-nitrosamines levels increased by more than fourfold, from ~20 µM to 90 µM in the simulated stomach medium. The concentration of N-nitrosamines that were generated in the meat product by S-nitroso-cysteine and S-nitroso-N-acetylcysteine almost did not change after the transfer to simulated stomach medium, at pH 3.0.

In summary, from the perspective of restraining N-nitrosamines formation, S-nitroso-N-acetylcysteine clearly emerges as the best additive from the study conducted in a meat model system.

Example 5

The Effect of Sodium Nitrite (Comparative), S-nitroso-cysteine (Comparative) and S-nitroso-N-acetylcysteine (of the Invention) on the Color of the Meat Nitrite is known to be responsible for the characteristic pink color associated with cured meat products and flavor stabilization. The color development and color stability of ground beef treated S-nitroso-cysteine and S-nitroso-N-acetylcysteine after heating to 72° C. was compared to the color of ground beef treated with nitrite. A portable colorimeter (X-rite) was used to measure Hunter color lightness, redness and yellowness (L*, a*, b*) values of ground beef samples treated with the different additives and heated in a microwave oven (Dow, S-Korea, at 800 W) to 72° C. in the center. The instrument was standardized using white and black standard plates.

Figure 6A:
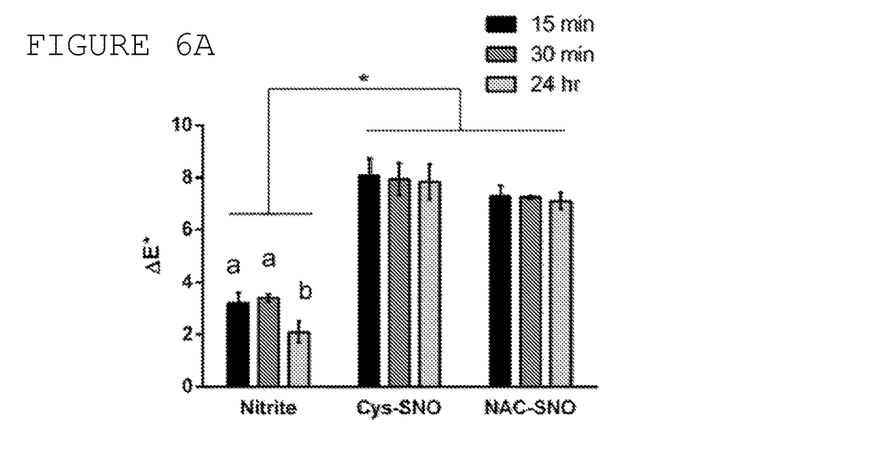
FIGS. 6A-6C illustrate the effect of the additives on the color of the meat.
Figure 6B:
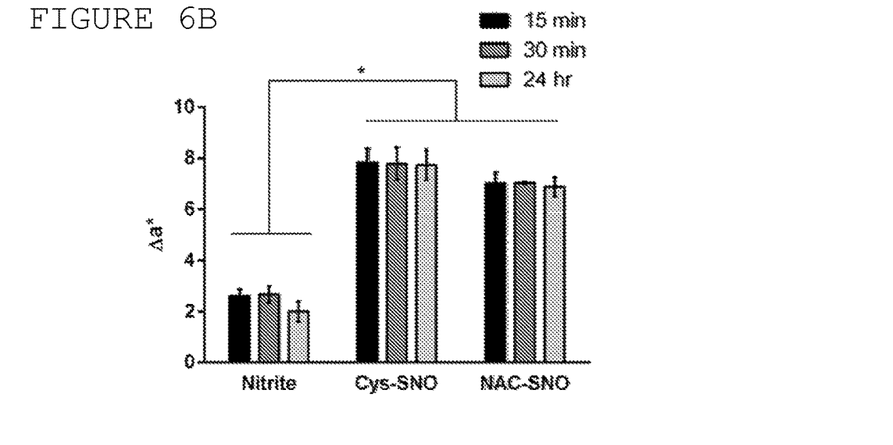
Figure 6C:
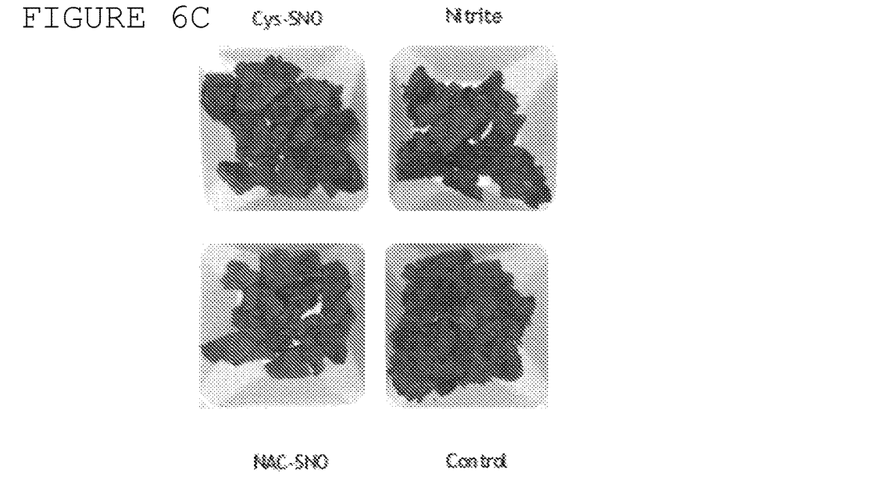

The results are given in the form of bar diagram in FIGS. 6A and 6B. There was a significant difference in total color difference (ΔE*) (FIG. 6A) and in redness (Δa*) (FIG. 6B) between the meat treated with S-nitrosocysteine or S-nitroso-N-acetylcysteine, and meat treated with sodium nitrite. The meat treated with either S-nitroso-cysteine or S-nitroso-N-acetylcysteine was twofold redder and better color looking than the meat treated with sodium nitrite (there was no difference in yellowness (Δb*) between the treatments and hence these results are not shown). In the RSNO treatment (either S-nitroso-cysteine or S-nitroso-N-acetylcysteine) under aerobic conditions the color remained stable over a period of 24 h, whereas the color in nitrite-treated meat decreased over time (see FIG. 6A). The differences are readily visible also from the photo appended as FIG. 6C.

Example 6

Antimicrobial Activity of Sodium Nitrite (Comparative) and S-nitroso-N-acetylcysteine (of the Invention) in Smoked Beef Shoulder Smoked beef shoulder manufacturing process: brine ingredients [water, modified starch (E-1442), maltodextrin, salt, flavor enhancers (monosodium glutamate, yeast extract), preservatives (potassium lactate and potassium acetate and either sodium nitrite or S-nitroso-N-acetylcysteine), phosphate, carrageenan, seasoning, antioxidants (oregano extract, ascorbic acid)] were mixed to form the brine solution. S-nitroso-N-acetylcysteine was added to the brine in the form of freshly prepared aqueous solution (amount equivalent to 150 ppm sodium nitrite and 2% NaCl in the final product).

Next, the brine was added at 50% (w/w) to previously cleaned from fat and cut into large cubes beef shoulder. Then the meat was tumbled under vacuum. In order to emulsify the meat, about 23% of the meat was transferred to an industrial cutter. Afterwards the emulsion was mixed with the rest of the tumbled meat in a mixer for several minutes. The meat was then stuffed into fibrous casing, which was transferred to steam cooking till the center of the product reached a temperature of 72° C. The product was then rapidly chilled to 4° C., sliced and packed in a low oxygen modified atmosphere. The pastrami was stored at 4° C. for three months.

Aerobic colony count of naturally occurring bacteria in smoked beef shoulder pastrami: 5 gr of the pastrami manufactured in a meat factory as described above were homogenized in a sterile grinder with 45 ml of sterile saline, then further diluted with saline. The diluents were plated on BHI agar plates and incubated at 30° C. for 24 hr then colonies were counted and CFU calculated.

Figure 7:
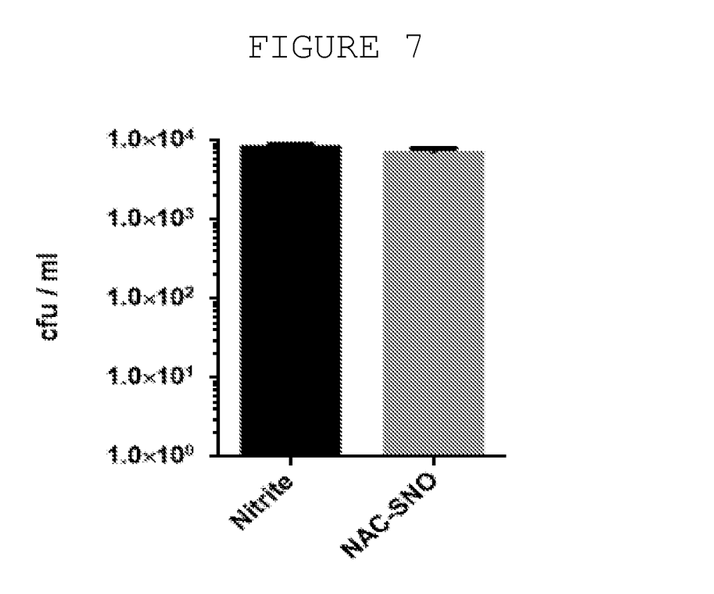
FIG. 7 is a bar diagram showing aerobic colony count after three months of naturally occurring bacteria, in smoked beef shoulder pastrami prepared with nitrite or S-nitroso-N-acetylcysteine (plates were incubated at 30° C. for 24 hours then colonies were counted and CFU calculated).

The results shown in the form of bar diagram in FIG. 7 indicate that the antimicrobial activity of nitrite and S-nitroso-N-acetylcysteine is comparable, seeing that after three months, upon expiration of the product's shelf life, the treated pastrami developed similar concentration of bacteria: nitrite treated pastrami developed $8*10^3$ CFU/ml and S-nitroso-N-acetylcysteine-treated pastrami $7*10^3$ CFU/ml.

Example 7

Antimicrobial Activity of Sodium Nitrite (Comparative), S-nitroso-cysteine (Comparative) and S-nitroso-N-acetylcysteine (of the Invention) in Ground Beef 10 gr of ground beef shoulder was mixed with 1 ml (25 mM) aqueous solution of the tested preservative (Sodium nitrite, S-nitroso-cysteine and S-nitroso-N-acetylcysteine) or DDW for control and 1 ml of NaCl solution (10% w/v). The final concentrations were 2.5 mM preservative (where Kg meat=L) and 1% (w/w) NaCl. The meat was divided to 1 gr portions and placed in open vacuum bags, then heated in a water bath at 75° C. for 15 min and sealed by MULTIVAC C100 at a vacuum of 8 mbar. The bags were transferred to 4° C. for cooling and storage. After time periods of 1 hr, 1 week and 4 weeks elapsed, the bags were opened in a hood and 1 gr of meat was homogenized in a sterile grinder with 9 ml of sterile saline, then the homogenate was diluted further with saline and the diluents were plated on BHI agar plates. The plates were incubated at 30° C. for 24 hours then colonies were counted and CFU calculated.

Figure 8:
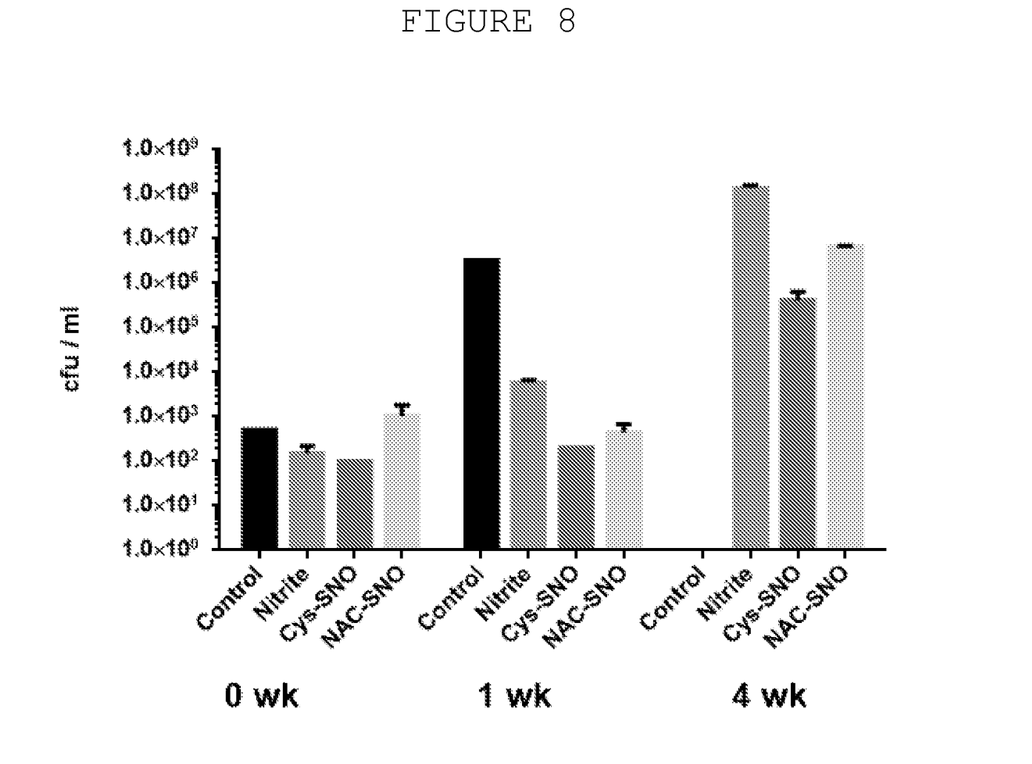
FIG. 8 is a bar diagram showing aerobic colony count after 0-4 weeks of naturally occurring bacteria, in ground beef shoulder treated with nitrite, S-nitroso-cysteine (Cys-SNO) or S-nitroso-N-acetylcysteine (NAC-SNO) (plates were incubated at 30° C. for 24 hours then colonies were counted and CFU calculated).

The results are shown in the form of a bar diagram in FIG. 8. It is seen that after 1 hour of cooling at 4° C., all treatments had a similar concentration of bacteria ~$10^2$-~$10^3$. After 1 week of storage at 4° C. nitrite-treated meat bacteria count had a minor increase to $5.8*10^3$ cfu/ml while S-nitroso-cysteine and S-nitroso-N-acetylcysteine remained ~$2.0*10^2$, all three treatments achieving significantly lower concentration of bacteria compared to control ($3.3*10^6$). After 4 weeks the nitrite treated meat had a bacteria concentration of ~$10^8$ whereas Cys-SNO and NAC-SNO treated meat had a lower bacteria concentration.

Example 8

The Effect of NAC-SNO on *Clostridium perfringens*

Figure 9:
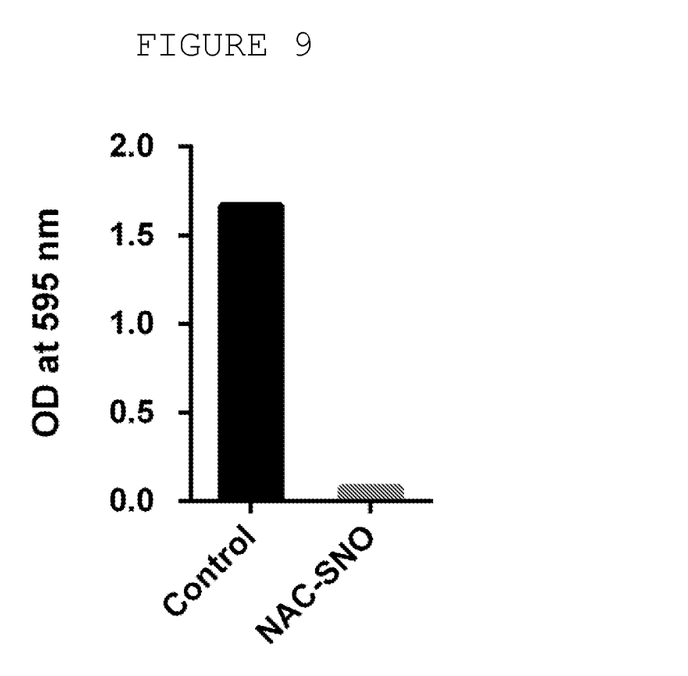
FIG. 9 is a bar diagram showing bacterial growth after 24 h at 37° C. determined by measuring the OD at 595 nm of *C. perfringens* suspension treated with 2.5 mM NAC-SNO or DDW as a control.

*C. perfringens* cells were grown overnight at 37° C. in fluid thioglycollate medium (FTM). Then the bacterial suspension was diluted in FTM to reach optical density (OD) of 0.1 A at 595 nm. The suspension was divided to tubes (7 ml per tube), then 70 µl of NAC-SNO was added to the tubes to a final concentration of 2.5 mM. DDW was added as a control. The tubes were gently mixed and incubated for 24 h at 37° C. Bacterial growth was determined by measuring the OD at 595 nm. The results are shown in the form of a bar diagram in FIG. 9.

The invention claimed is:

1. A process for curing food while suppressing nitrosamine formation, the process comprising the step of adding to the food S-nitroso-N-acetylcysteine or a physiologically acceptable salt or ester thereof, whereby the food is cured while suppressing nitrosamine formation.

2. A process according to claim 1, further comprising adding an additional inhibitor of nitrosamine formation to the food.

3. A process according to claim 2, wherein the additional inhibitor of nitrosamine formation is ascorbic acid or a physiologically acceptable salt or ester thereof.

4. A process according to claim 1, wherein the food is meat and wherein the S-nitroso-N-acetylcysteine or a physiologically acceptable salt or ester thereof is added to the meat to produce a cured meat product.

5. A process according to claim 4, further comprising adding nitrite to the meat, such that the nitrite is present in a concentration in the meat of below 150 ppm.

6. A process according to claim 5, wherein nitrite is added such that the nitrite is present in a concentration in the meat of below 120 ppm.

7. A process according to claim 1, devoid of nitrite addition.

8. A process according to claim 1, further comprising a step of providing low-oxygen environment by creating vacuum or purging with inert gas to replace oxygen with inert gas during preparation, packaging or storage of the food product.

9. The process according to claim 1, achieving at least one of reduction of microorganisms, improvement of product color and contribution to flavor.

10. The process according to claim 1, wherein the food is meat and the process achieves suppressing nitrosamine formation.

11. The process according to claim 1, wherein the food is meat and the process achieves reduction of microorganisms and improving the meat color.

12. A composition for curing meat while suppressing nitrosamine formation, comprising S-nitroso-N-acetylcysteine or a physiologically acceptable salt or ester thereof, and at least one meat additive.

13. A composition according to claim 12, wherein the meat additive is selected from the group consisting of sodium chloride, potassium chloride, sugar, antioxidants, inhibitors of nitrosamine formation comprising one or more of ascorbic acid and physiologically acceptable salts or esters thereof, flavor additives and a mixture thereof.

14. A composition according to claim 13, which is a curing salt blend consisting of from 0.5 to 20% by weight S-nitroso-N-acetylcysteine or a physiologically acceptable salt or ester thereof, and 80 to 99.5% by weight sodium chloride.

15. A composition according to claim 13, comprising a compound of S-nitroso-N-acetylcysteine or a physiologically acceptable salt or ester thereof, sodium chloride and/or one or more sugars, and optionally one or more additional inhibitors of nitrosamine formation.

16. A composition according to claim 13, which is a brine solution comprising water, the compound of S-nitroso-N-acetylcysteine or a physiologically acceptable salt or ester thereof, sodium chloride, sugars and optionally one or more additional inhibitors of nitrosamine formation.

17. A cured meat product with suppressed nitrosamine formation, comprising at least 10 ppm of S-nitroso-N-acetylcysteine or a physiologically acceptable salt or ester thereof, and optionally nitrite, wherein the concentration of nitrite, if present, is below 150 ppm.

18. Meat product according to claim 17, wherein the nitrite is present in a concentration of below 120 ppm.

19. Meat product according to claim 18, which is nitrite free, said product comprising at least 100 ppm of added S-nitroso-N-acetylcysteine or a physiologically acceptable salt of ester thereof.

20. Meat product according to claim 17, which further comprises at least 20 ppm ascorbic acid or physiologically acceptable salt or ester thereof.

21. The meat product according to claim 17, wherein the product is selected from smoked poultry, including smoked poultry breasts and smoked poultry rolls; corned beef; ham; bacon; and meat-based sausages.

* * * * *